Jan. 10, 1939. J. L. BARR 2,143,181
PARKING DEVICE
Original Filed April 6, 1933  3 Sheets-Sheet 1
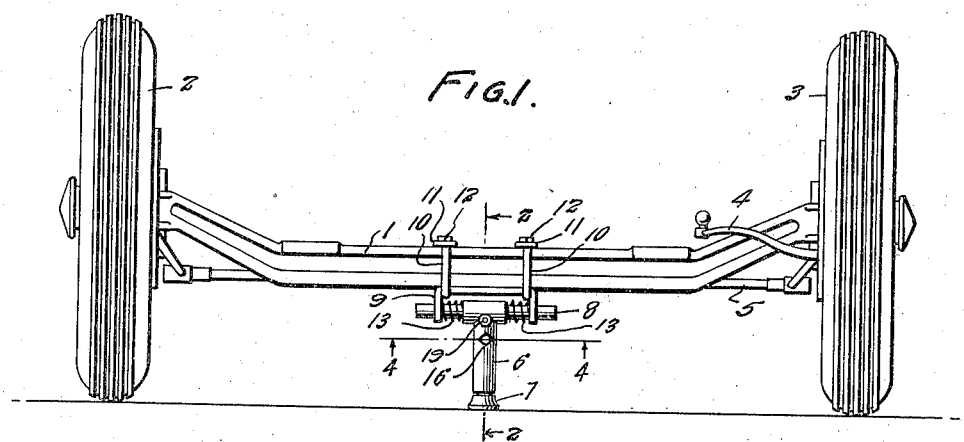
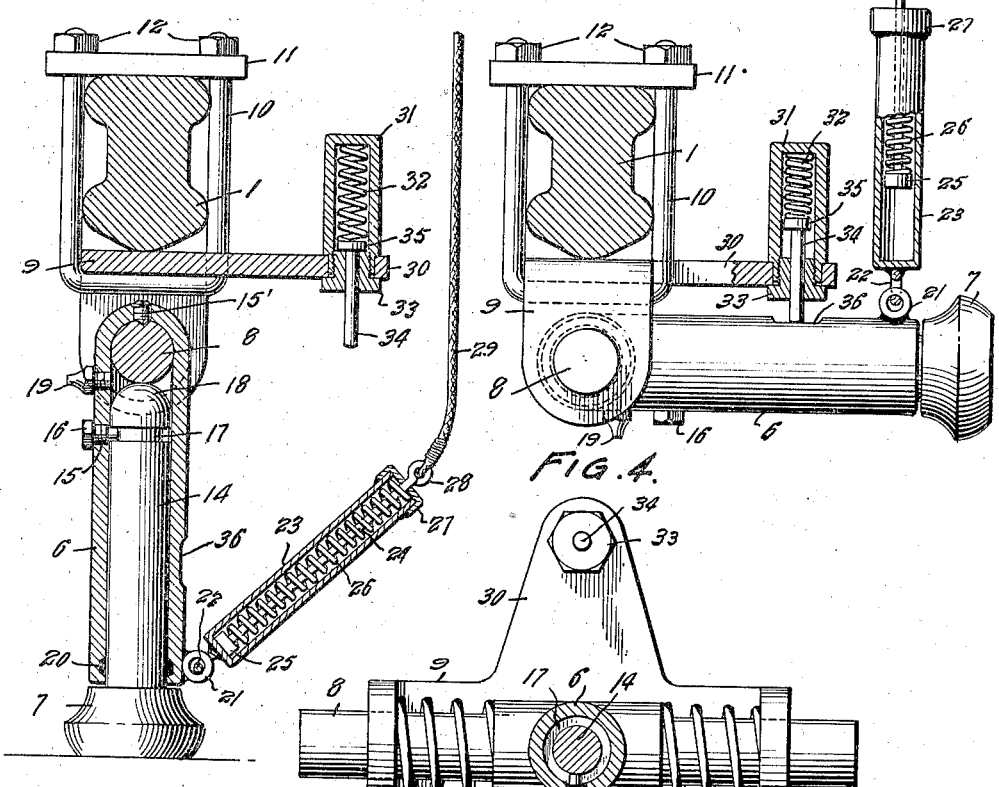
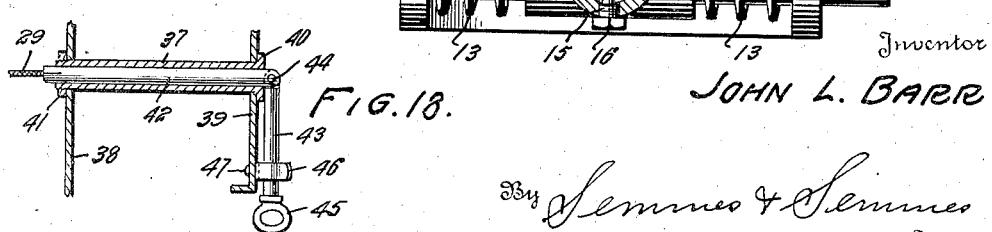
Inventor
JOHN L. BARR
By Semmes & Semmes
Attorneys

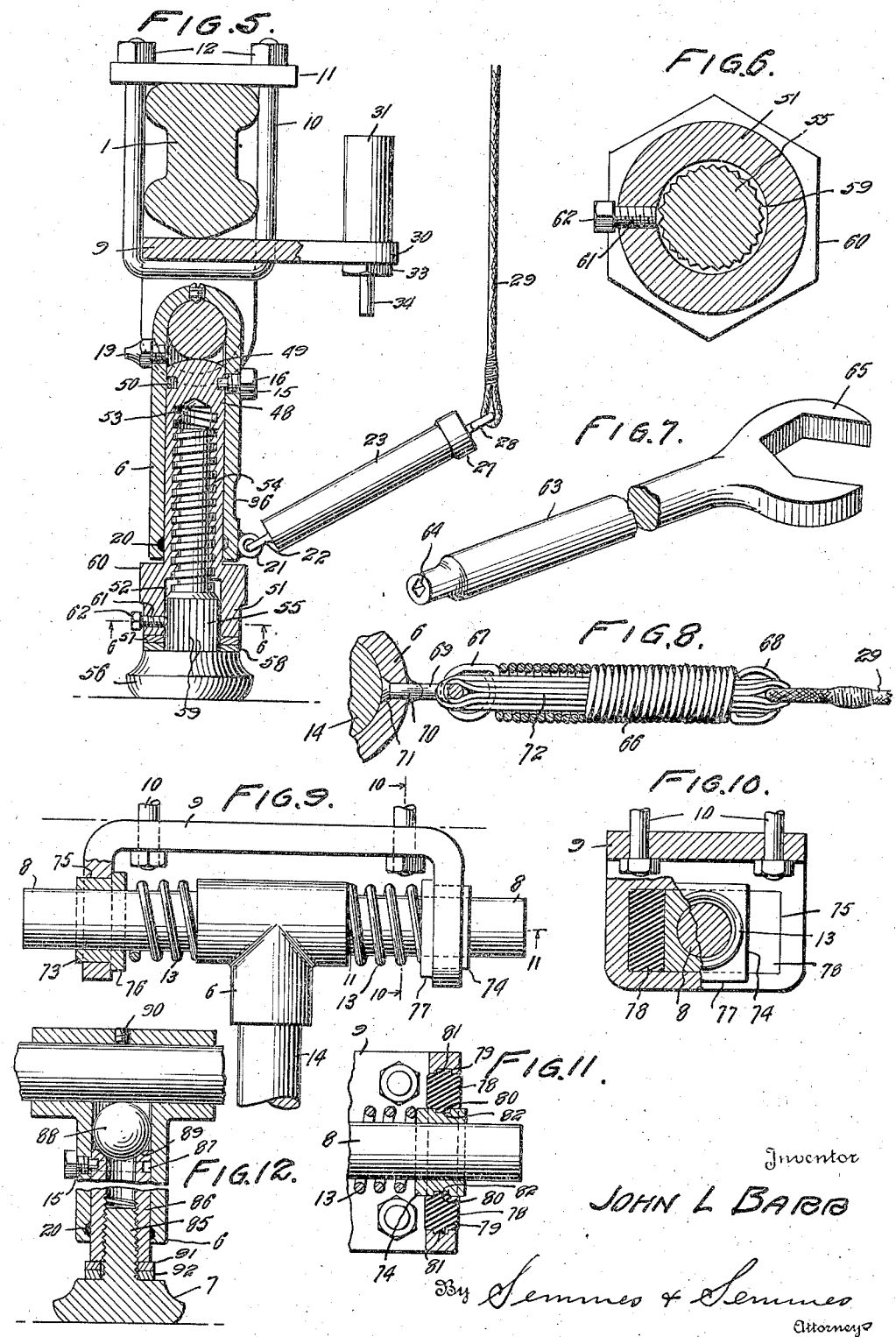

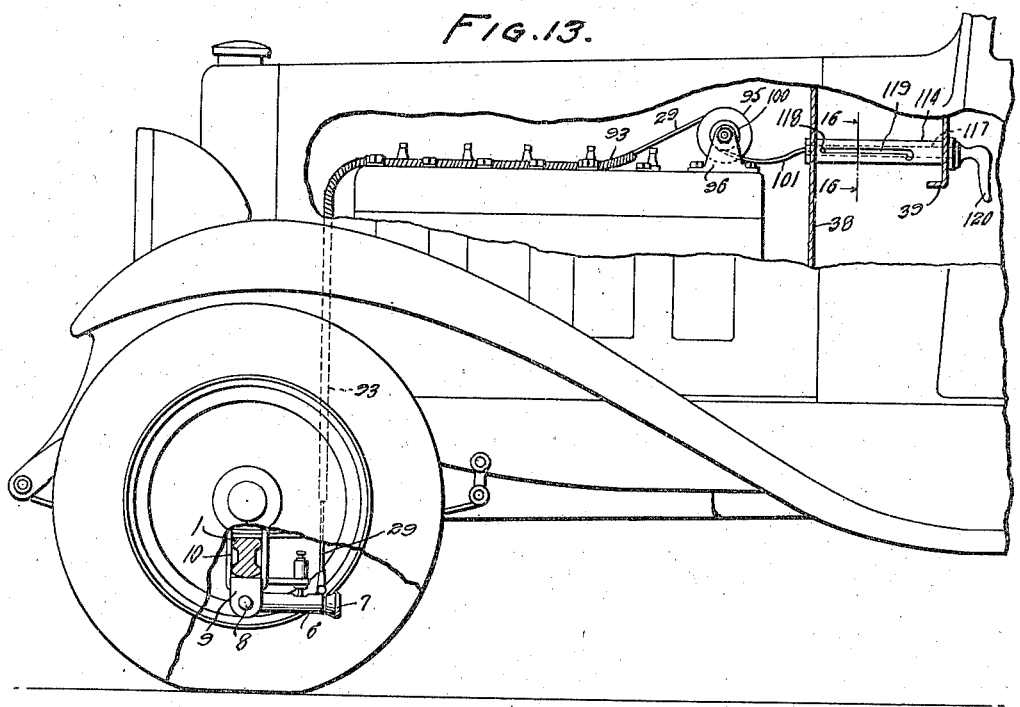

Patented Jan. 10, 1939

2,143,181

UNITED STATES PATENT OFFICE 2,143,181

PARKING DEVICE

John Lester Barr, Chevy Chase, Md.

Application April 6, 1933, Serial No. 664,817
Renewed May 14, 1937

7 Claims. (Cl. 280—150)

This invention relates in general to vehicle accessories and more particularly has reference to a parking device.

This application is a continuation in part of my following copending applications: Serial No. 350,685, filed March 28, 1929, now Patent Number 1,967,219, dated July 24, 1934; Serial No. 347,254, filed April 22, 1929; Serial No. 363,172, filed May 15, 1929, now Patent Number 1,954,308, dated April 10, 1934; Serial No. 393,490, filed Sept. 18, 1929; Serial No. 480,511, filed Sept. 8, 1930, now Patent Number 1,969,198, dated August 7, 1934; Serial No. 629,691, filed Aug. 20, 1932, now Patent Number 2,086,459, dated July 6, 1938; Serial No. 648,649, filed Dec. 23, 1932, now Patent Number 2,075,926, dated April 6, 1937.

I have disclosed in these foregoing applications a support for mounting on the end of a vehicle carrying the steering wheels. The support is adapted to be lowered for swinging movement past the vertical, whereby the steering wheels may be elevated, or the weight thereon substantially relieved by forward or backward movement of the vehicle on and off the support. This enables free turning of the steering wheels to facilitate maneuvering of a vehicle in and out of a restricted space, such as a parking area.

I have found it desirable in a support of this character to provide for sidewise and twisting movement thereof and for tensioning in an inoperative position. It is to these features that the present application is principally directed.

An object of this invention is to provide a support on which one end of a vehicle may be elevated by backward or forward movement thereof, the support being capable of rotating or twisting, and of having the vehicle move sidewise with respect thereto.

Another object of this invention is to provide a support on which one end of a vehicle may be elevated by backward or forward movement thereof in which a portion of the support may rotate with respect to the other portion with a minimum of friction.

Still another object of this invention is to provide a support, on which one end of a vehicle may be elevated by backward or forward movement thereof, resiliently mounted on a vehicle.

Still another object of this invention is to provide a support, on which one end of a vehicle may be elevated by backward or forward movement thereof, adapted to be held in an inoperative position by a tension and a compensating device.

A further object of this invention is to provide a support, on which one end of a vehicle may be elevated by backward or forward movement thereof, adaptable for use as a jack.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawings means for carrying the same into practical effect without limiting the improvements in their useful applications to the particular constructions, which, for the purpose of explanation, have been made the subject of illustration.

In the drawings:

Fig. 1 is a front view of a vehicle axle showing my novel support and its manner of mounting thereon for elevating or substantially relieving the weight on the steering wheels to facilitate turning thereof.

Fig. 2 is a side view, partly in section, showing the support and its manner of mounting in operative position.

Fig. 3 is a side view, partly in section, of the support and its manner of mounting in inoperative position.

Fig. 4 is a bottom view taken on line 4—4 of Fig. 1.

Fig. 5 is a side view, partly in section, showing a modified form of support adapted to use as a jack.

Fig. 6 is a bottom view taken on line 6—6 of Fig. 5.

Fig. 7 is a perspective view of a jack handle for use with the structure shown in Fig. 5.

Fig. 8 is a side view, partly in section, of a modified form of a tension device for holding the support in inoperative position.

Fig. 9 is a front view showing a modified form of a resilient mounting for the support.

Fig. 10 is a side view taken on line 10—10 of Fig. 9.

Fig. 11 is a bottom view taken on line 11—11 of Fig. 9.

Fig. 12 is a front sectional view showing a modified form of an extensible support.

Fig. 13 is a side view, partly in section, and partly broken away, showing a modified form of tension device and an operating member for fixing the support in operative position.

Fig. 14 is a side view, partly in section, of the tensioning device shown in Fig. 13.

Fig. 15 is a front view taken on the line 14—14 of Fig. 14.

Fig. 16 is a side view taken on line 15—15 of Fig. 15.

Fig. 17 is a front view taken on line 16—16 of Fig. 13.

Fig. 18 is a side view partly in section of a suitable control device.

Referring more particularly by numerals to the drawings in which the same and similar elements are designated by like symbols of reference throughout, and more especially to Fig. 1, there is shown the front axle of a conventional vehicle having steering wheels carrying tires 2 and 3, mounted in the usual manner thereon. A steering rod is indicated by the numeral 4 and a tie rod by 5.

My novel support is adapted to be centrally mounted on the axle across the longitudinal axis of a vehicle. The support comprises a T-shaped member 6 having a rotatable foot 7 adapted to act as a ground contact portion projecting from the lower end thereof. A rod 8 is adapted to be centrally fixed in the top of the T-shaped member for extending through apertures provided in a securing member 9 which has the form of a section of channel iron. The member 9 is adapted to be fixed on the under side of the axle by U bolts 10, extending through apertures and plates 11, resting on the top of the axle, and fixed by nuts 12. Helical springs 13 are interposed between the ends of the securing member 9 and the ends of the top of the T-shaped member.

The support described is normally adapted to be held in inoperative position. When lowered the support is of such a length that the tires 2 and 3 will be substantially relieved of the weight of the vehicle by elevation of the axle 1 on the support through backward or forward movement of the vehicle, depending upon which side of the vertical the support is resting. Thus, when maneuvering in a restricted space of the character of a parking area, turning of the steering wheels of a vehicle may be facilitated. The bar 8, fixed with respect to the T-shaped member 6, is adapted to slide and rotate in the apertures of the ends of the securing member 9, the support, however, being normally centered by the springs 13. As the foot 7 is rotatable, twisting forces exerted on the support through the elevation of the vehicle thereon, particularly when the steering wheels are turned at an angle, are compensated therefor.

Referring more particularly to Fig. 2, the support is shown in operative position as to the construction and manner of mounting in greater detail. The axle 1 is shown in cross section and the securing member 9 is shown fixed thereon by a U bolt 10 and plate 11 and nuts 12. The bar 8 is fixed against rotation in the top of the T-shaped member by a set screw 15' engaging in a recess in the bar.

The foot 7 is formed on the end of a bar 14 which is adapted to be fitted in the lower end of the T-shaped member 6 for rotation therein. The bar 14 is adapted to be held in the lower end of the T-shaped member 6 by a screw 15 having a nut head 16, extending through the wall of the T-shaped member and engaging in a slot 17 in the periphery of the bar. The top of the bar 14 is rounded as at 18 for contacting with the bar 8 at a single point so as to minimize the friction therebetween with rotation on the foot 7 carried on the end of the bar 14. The point of contact between the respective bars is adapted to be lubricated through the grease admitted through a cup 19 provided in the wall of the lower end of the T-member adjacent the point of contact. The grease thus admitted is also adapted to provide for facilitating the rotation of the bar 14 with respect to the lower end of the T-member. A packing gland 20 is provided in the lower end of the T-member to prevent the grease therein from exuding, and if desired a slot could be provided in bar 14 at this point to make a more positive barrier. Also, packing glands could be put around bar 8.

A ring 21 is provided on the bottom or higher up on the T-shaped member at the rear for receiving a ring 22 fixed on the end of a casing 23. Casing 23 is adapted to receive rod 24 having a stop 25 fixed on the lower end thereof and extending through helical spring 26. The top of the case is provided with closure 27 having an aperture for accommodating the end of of the rod 24 which is terminated in a ring 28. The end of a cord or cable 29 is adapted to be fixed in the ring 28, and the other end suitably secured in the driving compartment of the vehicle for raising the support to an inoperative position as shown in Fig. 3. It is to be further noted that this casing 23 and its contained mechanism just described could be used in the reverse position by attaching the cord or cable 29 in the ring 21 and having the casing 23 with its contained mechanism positioned in a reverse manner, said casing to be located in the driving compartment of the vehicle or other place where it could be used to raise or lower the support through an attachment on ring 22 operated by the driver.

The securing member 9, as shown in Figs. 2, 3 and 4, is provided with a rearwardly extending projection 30 having an aperture for receiving the constricted neck of a casing 31 adapted to accommodate a helical spring 32. The casing could be either screwed into projection 30 in a threaded aperture or, as shown, could be fixed on the projection by plug 33, engaging thereon on the under side of the projection, and having an aperture for receiving a rod 34 provided with a stop 35 on the top end thereof. When the support is raised, a portion of the member 6 is adapted to contact with the lower end of the rod 34, being provided with a recessed portion 36 at the point of contact and thus being held in its inoperative position against the tension of the spring 32. The spring 26 in the casing 23 will also be held under tension as shown in Fig. 3. Spring 32 is adapted primarily to prevent rattling or slapping of the support when in inoperative position, while the spring 26 is compensating for relative movement between the frame of the vehicle and the front axle while in motion.

In Fig. 18 there is shown a suitable device for mounting in the driving compartment of the vehicle for raising and lowering the support. This device comprises a tubular member 37 for fitting in apertures provided in the fire wall 38 and dashboard 39 of a vehicle, or it may be mounted in any other desirable manner. One end of the tubular member is provided with an integral collar 40, and the other end threaded for receiving a nut 41 to fix the tube in position. A rod 42 is adapted to slide in the tube 37, and the other end of the cable or cord 29 fixed thereto. Another section of rod 43 is hinged in the outer end of the rod 37 by a pin 44, and a handle 45 is provided on the end of the rod 43. The rod 43 is adapted to be normally held in a spring clip 46, fixed on the dashboard by a pin 47, to maintain the support in a raised position as shown in Fig. 3. When it is desired to lower the support for elevating or relieving the weight on the steering wheels so that free turning thereof may be accomplished, the rod 43 is adapted to be raised by grasping the handle 45 until the axis thereof coincides with the rod 42, when the rod 43 may be pushed into the tube 37, and drawn therein under the tension of the spring 26 and 32 to lower the support for freedom of movement on each side of the vertical, upon backward and forward movement of the vehicle. When it is desired to raise the support to an inoperative position, the rod 43 is withdrawn from the tube 37 by pulling on the handle 45, and the rods secured in the clip 46.

The support may be modified to include a jack construction as shown in Fig. 5, wherein the elements already described may be identical, except that the bottom portion of the T member 6 is shortened, and a substitute member 48 provided for the bar 14, adapted to carry the foot 7 in the support first described. The member 48 has a rounded top 49 for one point contact against the bar 8, like the member 14, and a peripheral channel 50 adjacent the top for accommodating the end of the screw 15 to hold the member 48 in the T member, as described in the first construction. The lower end of the member 48 is formed with an enlarged portion 51 below the end of the T member, which has a central recess 52 communicating with a threaded aperture 53 in the body of the member 48. There is adapted to be threaded in the aperture 53 a threaded leg 54 having an enlarged portion 55 formed on the lower end for fitting in the recess 52 in the enlarged portion 51 on the lower end of the member 48. A foot, or ground contact portion 56 corresponding to the foot 7 shown in Figs. 1 to 3 is fixed or integrally formed on the bottom of the enlarged portion 55 on the leg 54. A pair of washers 57 and 58 are interposed between the foot and the bottom of the enlarged portion 51 of the member 48.

The exterior periphery of the enlarged portion 55 on the leg 54 is serrated as indicated at 59 in Fig. 6, and the enlarged portion 51 on the member 48 formed with hexagonal side portion 60.

A screw 61 having a bolt head 62 is screwed in the threaded aperture in the periphery of the large portion 51 on the member 48 for engaging the serrations 59 in the periphery of the large portion 55 on the leg 54 to normally prevent relative movement between the foot 56 and the member 48. When the member 48 and the leg 54 are thus locked against relative movement, the support is adapted to function in the manner already described, with the foot 56 rotating with the member 48. When it is desired to employ this form of support as a jack, however, the axle of the vehicle carrying the support is elevated thereon as shown in Fig. 5, and the screw disengaged from the serrations on the enlarged portion 55 of the leg 54. This may be accomplished with the use of a socket wrench for engaging the nut head 62 or a special tool 63, such as shown in Fig. 7, having a socket wrench 64 formed on one end thereof. With the disengagement of the screw 61, the leg 54 is free for relative movement with respect to the member 48, and may be raised or lowered with respect thereto by rotation thereof. This may be accomplished with any conventional wrench or through a special wrench 65 formed on the other end of the tool 63 for engaging the hexagonal sides 60 formed on the enlarged portion 51 on the bottom of the member 48.

In Fig. 8 there is shown a modified form of spring device for connection between the support and the cord or cable 29. This comprises a helical spring 66 having rings 67 and 68 formed on the ends for engagement by the cord or cable 29, and the ring on the support. In place of the ring 21 on the support shown in Figs. 2 and 3, there may be substituted a ring 69, having an extension 70 for extending through an aperture in the wall of the T member 6, and terminating in a flared extension 71 for fitting a tapered recess provided in the periphery of the T member 6. In addition to the spring 66 for connecting the cable or cord to the support, elastic cord 72 is wrapped several turns between the cord and ring within the spring member 66. This cord will relieve the strain on the spring 66, and in the event of failure of either the spring or cord, a supplemental tension member will remain to maintain the support in a raised position. Of course this tension mechanism may be attached on the other end of the cord 29 and the cord 29 be attached directly to ring 69.

In Figs. 9 and 10 there is shown a support similar to that shown in Figs. 1 to 4, except that the rod 8 for fitting in the T member is intended to be operated through members 73 and 74 which may move sidewise in slots 75 provided in the ends of the securing member 9 shown in Fig. 10. The members 73 and 74 are formed with enlarged portions 76 and 77 adapted to abut against the down turned portions of the securing member 9 adjacent the edges of the slots, the members 73 and 74 being adapted to be held in the slots by the springs 13, and if desired or found necessary they could be positively held in the slots 75 by any one or more ways, such as portions similar to enlarged portions 76 and 77 being attached to the opposite ends of said members 73 and 74, to which enlarged portions 76 and 77 are attached. Perhaps the simplest way to accomplish the purpose would be to fasten a pin in the top and another in the bottom of the said members 73 and 74 where they project out of the securing member 9. Sections of rubber or other resilient material 78 are adapted to be fixed in the slots 75 between the side edges of the members 73 and 74, and the side edges of the slots. Twisting or other movement against the sections of resilient material 78 by the members 73 and 74, caused by bar 8 sliding in and/or exerting a twisting force on said members 73 and 74 when vehicle wheels are cramped, is thus allowed to further compensate for twisting forces exerted on the support. These pads of resilient material 78 are retained in position by means of tongues 79 and 80 formed on the pads 78 which fit respectively in grooves 81 and 82 in the slots 75 and members 73 and 74. In this construction also the U bolts 10 for securing the member 9 to the axle of the vehicle may be extended through apertures provided in the member, the width of the member being greater than that of the member as shown in Figs. 1, 2 and 3.

In Fig. 12 there is shown a modified form of support which may be extended or retracted. In this construction a central threaded projection 85 is formed on the foot 7 for engagement in a tubular leg 86 for fitting in the lower end of the T member 6. The member 86 is adapted to be held in the lower end of the T member by the screw 15 engaging in a peripheral channel 87 formed adjacent the top end thereof. A ball 88 is interposed between the top of the tubular leg 86 and the bar 8 and the inner edges of the tubular member are beveled at the top as at 89 to minimize the friction in the rotation of the leg 86 with respect to the bar 8. The bar 8 and the top of the T member 6 are locked against rotation or endwise movement with respect to each other by a screw 90 extending through the T member and engaging in a recess in the bar. A plurality of washers 91 and 92 are shown interposed between the foot 7 and the lower end of the tubular leg 86. Additional washers may be added or withdrawn according to the adjustment of the foot 7 with respect to the tubular member.

In Fig. 13 there is shown a front portion of a conventional vehicle having the support described mounted on the front axle thereof, shown in the inoperative raised position. The support is held raised by the cord or cable 29, passed through a conduit 93, suitably fixed on the top of the engine block. The other end of the cable 29 is shown fixed in a peripheral channel 94 provided on a wheel 95, as shown in Figs. 14 and 15, the cord or cable being adapted to encircle the wheel when the support is in a raised inoperative position. The wheel is adapted to be mounted on a V-shaped bracket 96 secured on the top of the engine block by bolts 97 and 98, extending through apertures provided in a flange 99 on the upright, and engaging in the engine block. Manifestly the mounting may be accomplished in any other suitable manner.

A wheel 100 is integrally formed with the wheel 95, adapted to have a supplemental cord or cable 101, corresponding to the cable or cord 29, fixed in a peripheral channel 102 therein, the cord encircling the wheel 100. The wheel 100 is also formed with an annular rim 103 projecting therefrom adapted to accommodate a spiral spring member 104 fixed at the outer end of the inner periphery of the annular projection by a screw 105 as shown in Fig. 14.

The wheel 100 is adapted to be mounted in the bracket 96 on a bolt 106, for rotation relative thereto. The bolt 106 is extended through registering apertures provided in the bracket, the bracket having projecting collars 107 and 107' formed adjacent the rims of the apertures. The face of the collar 107 is serrated, and the bolt 106 formed with a reduced extension 108 having a portion of the periphery flat as indicated at 109 in Fig. 16. A collar 110 having one face serrated is adapted to be fitted over the reduced extension on the bolt for engaging against the face of the collar 107. There is also adapted to be mounted on the reduced extension 108 a lock washer 111. The collar 110 and the washer 111 are fixed in position by a nut 112 screwed thereon. It will thus be seen that the bolt 106 is locked against rotation with respect to the bracket and wheel. The inner end of the spring 104 is fixed to the bolt 106 by a screw 113, as shown in Fig. 14. The spring is adapted to be tensioned so as to normally maintain the support in the raised inoperative position shown in Fig. 13. The tension of the spring may be adjusted by loosening of the nut 112 on the reduced extension 108 on the bolt so as to disengage the collar 110 from the collar 107 and allow rotation of the bolt, to tighten or loosen the spring.

The cord or cable 101 is adapted to be connected at its other end to an operating lever, such as is shown in Fig. 18, or a modified form of operating device such as is shown in Figs. 13, 14 and 17. This device comprises a casing 114, having a reduced threaded extension at each end for fitting through apertures provided in the fire wall and dashboard of a vehicle and secured therein by nuts 115 and 116. A rod 117 is adapted to be fitted in the casing 114, having the cord or cable 101 fixed to the end thereof. The rod 117 is provided with a pin 118 in the periphery thereof for engaging a bayonet slot 119, provided in the casing 114. A suitable handle 120 is fixed on the other end of the rod 117, accessible on the face of the dashboard. The operation of the construction will be readily apparent first with reference to Fig. 13. The support is attached to be held in the raised inoperative position by the tension of the spring 104. The rod 117 in the casing 114 pushes in the casing to its fullest extent. When it is desired to lower the support, the rod 117 is pulled out by grasping the handle 120, and fixed in position by the pin 118 thereon, engaging in the bayonet slot in the casing. The wheel will thus be rotated through the connection in the cord or cable 101 against the tension of the spring 104 to allow the support to drop. When it is desired to raise the support, the pin on the rod 117 is disengaged from the bayonet slot, and the rod pushed back in the casing 114, or drawn by the tension of the spring 104, when the support will be raised by the spring.

In Fig. 14 there is also shown a modified form of tensioning device to prevent rattling or slapping of the support. This is similar in all respects to that described in Fig. 3, except the casing 31 is provided with a central aperture at the top for accommodating a screw 121 and lock washer 122. A disc 123 is adapted to be interposed between the near screw 121 and the top of the spring 32. It will be seen in this construction that the tension of the spring 32 may be thus adjusted by screwing in or out of the screw 121, which is provided with a bolt head 124 for accommodating a wrench. Manifestly, this tensioning device may also be adapted to the tension devices shown attached to the support in Figs. 2 and 3.

There is accomplished by this invention a support for elevating the steering wheels of a vehicle or substantially relieving the weight thereon, whereby the wheels may be freely turned for maneuvering in a restricted area of the character of a parking space, the support being constructed to compensate for twisting or sidewise forces exerted thereon, adapted to be held without rattling in its inoperative position, and without strain on itself or on its securing member, with a novel operating device provided for operation of the support.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention or exceeding the scope of the appended claims.

I claim:

1. A device for elevating that part of a vehicle to which the steering wheels are attached, comprising elevating means pivotally supported at that part of the vehicle on an axis laterally disposed to the longitudinal axis of the vehicle to swing on both sides of the vertical, said means being adapted to engage the ground to elevate that part of the vehicle by backward or forward movement thereof, said elevating means comprising a T-shaped support member slidable transversely with respect to the vehicle, and normally adapted to be centered under spring tension, and carrying a bar having a rotatable foot member at the lower end thereof, said bar being supported on a single point contact.

2. A device for elevating that part of a vehicle to which the steering wheels are attached, comprising elevating means pivotally supported at that part of the vehicle on an axis laterally disposed to the longitudinal axis of the vehicle to swing on both sides of the vertical, said means being adapted to engage the ground to elevate that part of the vehicle by backward or forward movement thereof, said elevating means comprising a T-shaped support member normally held centered under spring tension and slidable transversely with respect to the vehicle, having a rotatable foot mounted in the lower end thereof, and means in the lower end of the T-shaped member for introducing lubricant to the foot mounting.

3. A device for elevating that part of a vehicle to which the steering wheels are attached, comprising elevating means pivotally supported at that part of the vehicle on an axis laterally disposed to the longitudinal axis of the vehicle to swing on both sides of the vertical, said means being adapted to engage the ground to elevate that part of the vehicle by backward or forward movement thereof, said elevating means comprising a T-shaped support member having the upper ends slidably and rotatably mounted in apertures provided in the down turned ends in section of channel iron, the channel iron being attached to the vehicle for carrying the support.

4. A device for elevating that part of a vehicle to which the steering wheels are attached, comprising elevating means pivotally supported at that part of the vehicle on an axis laterally disposed to the longitudinal axis of the vehicle to swing on both sides of the vertical, said means being adapted to engage the ground to elevate that part of the vehicle by backward or forward movement thereof, said elevating means comprising a T-shaped member having a bar projecting from the upper ends thereof for rotatably and slidably mounting on the vehicle, a tubular leg projecting from the lower end thereof, and rotatably mounted therein carrying a foot, and a ball bearing interposed between the tubular leg and the bar.

5. A device for elevating that part of a vehicle to which the steering wheels are attached, comprising elevating means pivotally supported at that part of the vehicle on an axis laterally disposed to the longitudinal axis of the vehicle to swing on both sides of the vertical, said means being adapted to engage the ground to elevate that part of the vehicle by backward or forward movement thereof, said elevating means comprising a T-shaped member having a bar projecting from the upper ends thereof for mounting in blocks slidable in ends of a section of channel iron mounted on the vehicle, against pads of resilient material, and a rotatable foot on the lower end of the T-shaped member.

6. A device for relieving weight on at least one of the steering wheels of a vehicle, comprising a support leg upon which the vehicle is adapted to be driven, an anti-rattle means upon which the leg bears in its up position, an operating cable attached to the leg, and spring means associated with the operating cable to exert spring tension on the leg in its up position to resiliently urge it against the anti-rattle means.

7. A device for relieving weight on at least one of the steering wheels of a vehicle comprising a support leg upon which the vehicle is adapted to be driven by either forward or backward movement of the vehicle, an anti-rattle means upon which the leg bears in its up position, an operating cable attached to the leg, and spring means associated with the operating cable to exert spring tension on the leg in its up position to resiliently urge it against the anti-rattle means.

JOHN LESTER BARR.